Figure 1:
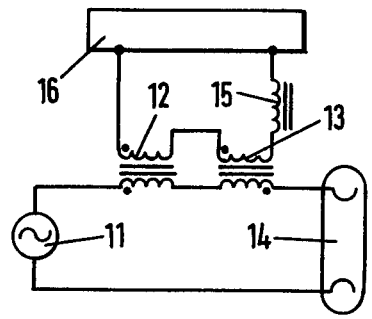

United States Patent [19]
Butterworth

[11] 3,936,721
[45] Feb. 3, 1976

[54] ELECTRICAL POWER SUPPLIES
[75] Inventor: Michael Lord Butterworth, Bognor Regis, England
[73] Assignee: Weir Electronics Limited, Sussex, England
[22] Filed: Nov. 15, 1973
[21] Appl. No.: 415,931

[30] Foreign Application Priority Data
Nov. 16, 1972 United Kingdom............... 52926/72

[52] U.S. Cl. ................... 321/25; 315/224; 315/279; 323/6; 323/45
[51] Int. Cl.² ........................................ H02M 5/10
[58] Field of Search ...... 315/224, 279, 282; 321/25; 323/6, 56, 45

[56] References Cited
UNITED STATES PATENTS

| | | |
|---|---|---|
| 2,039,044 | 4/1936 | Wolfert et al......................... 323/45 |
| 2,247,983 | 7/1941 | Barth ................................ 321/25 X |
| 2,486,250 | 10/1949 | Bixby................................ 321/16 X |
| 2,509,380 | 5/1950 | Walker ................................ 321/25 |
| 2,651,018 | 9/1953 | Marche............................ 321/25 X |
| 2,722,654 | 11/1955 | Sikorra ............................ 321/25 X |
| 2,798,571 | 7/1957 | Schaelchlin et al............... 321/25 X |
| 2,907,921 | 10/1959 | Cameron, Jr. et al................ 321/25 |
| 3,806,792 | 4/1974 | Untamo................................ 321/25 |

Primary Examiner—William M. Shoop
Attorney, Agent, or Firm—Ostrolenk, Faber, Gerb & Soffen

[57] ABSTRACT

An electrical power supply arranged to provide an alternating voltage output, which includes a pair of transductors or saturable reactors connected in phase opposition in series to the output and provided with means for supplying them with a constant d.c. control current so as to operate in the forced magnetization mode thereby providing a constant current source with a high output impedance, the output current being set by the control current.

6 Claims, 8 Drawing Figures

TRANSDUCTOR VOLTAGE

TRANSDUCTOR OUTPUT CURRENT

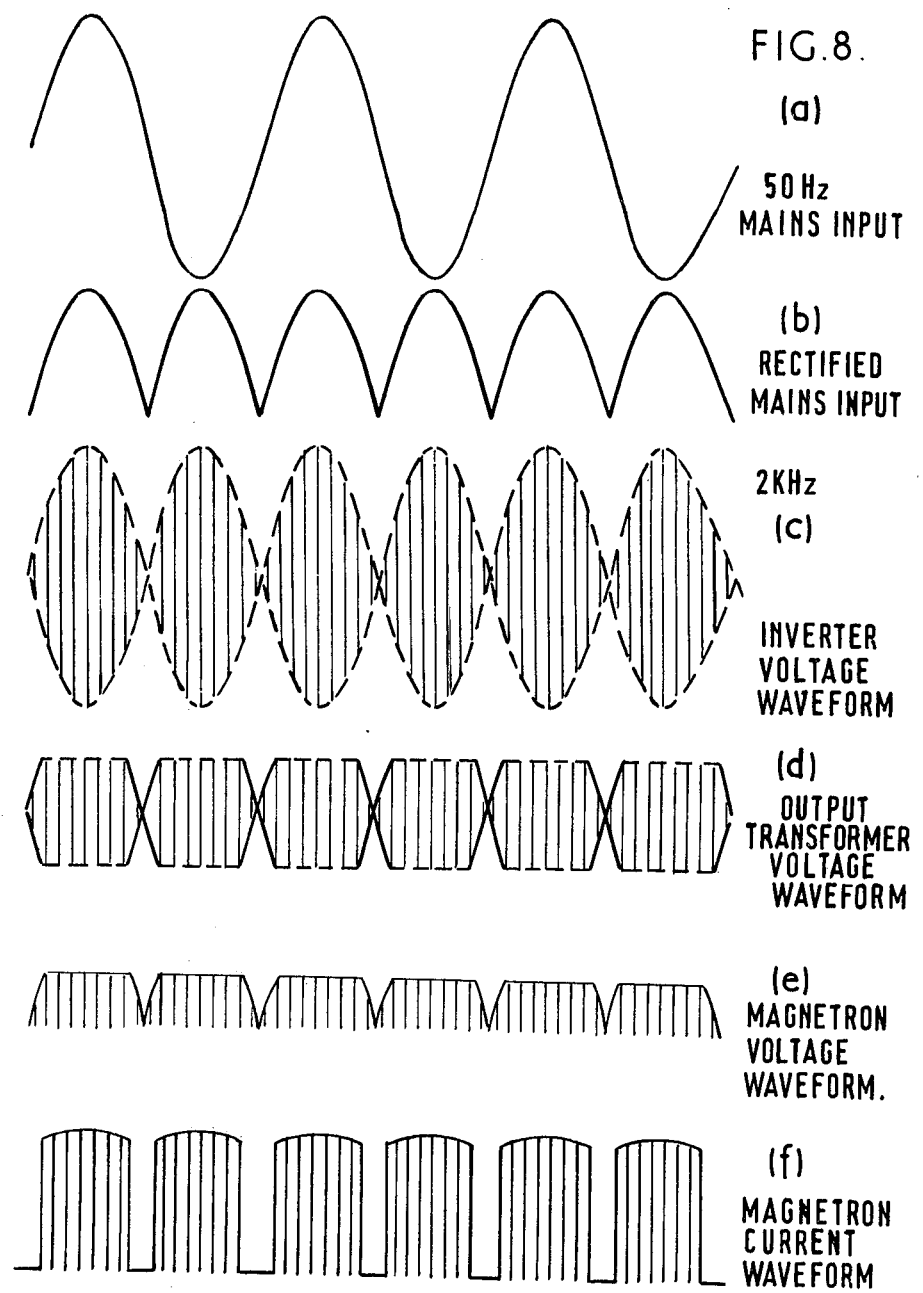

ELECTRICAL POWER SUPPLIES

This invention relates to electrical power supplies for loads where the coefficient of variation of electrical impedance of the load with the applied voltage is either negative (such as for a fluorescent lamp) or is very low (such as for a magnetron) such as to give rise to problems in the design of a suitable power supply.

It is an object of the present invention to provide an improved simple power supply for such loads in which the load current may be readily limited to a set desired level and held constant for variations of the supply voltage applied to the load, and variation in the impedance of that load.

The present invention relates to an electrical power supply arranged to provide an alternating voltage output, which includes a pair of transductors or saturable reactors connected in phase opposition in series with the output and provided with means for supplying them with a constant d.c. control current so as to operate in the forced magnetization mode thereby providing a constant current source with a high output impedance, the output current being set by the control current.

Figure 2:
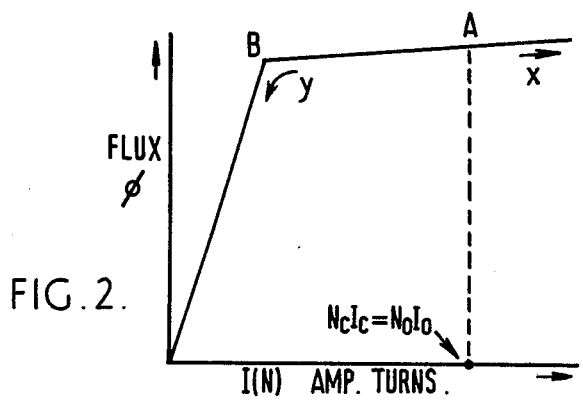
Figure 3:
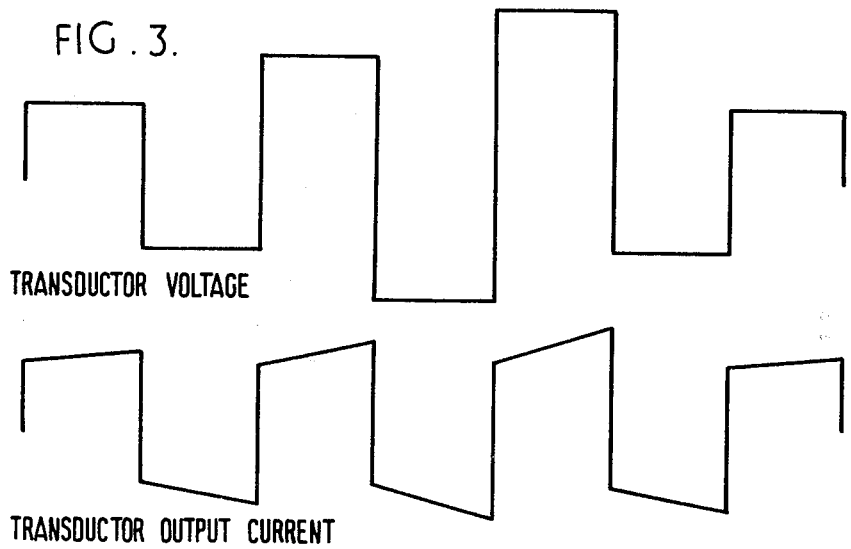
Figure 4:
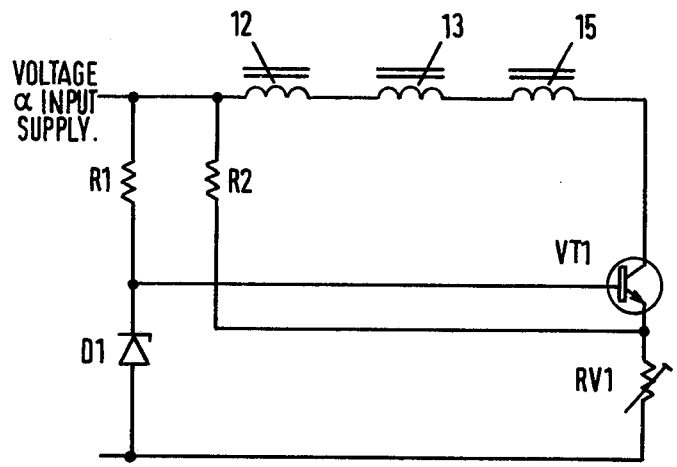
Figure 5:
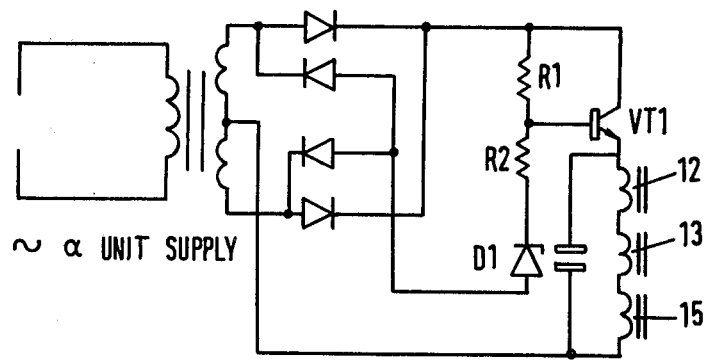
Figure 6:
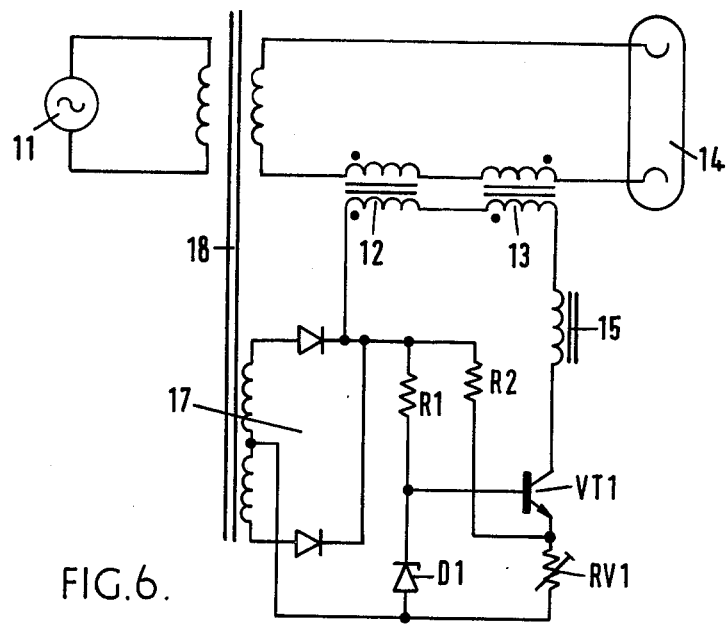
Figure 7:
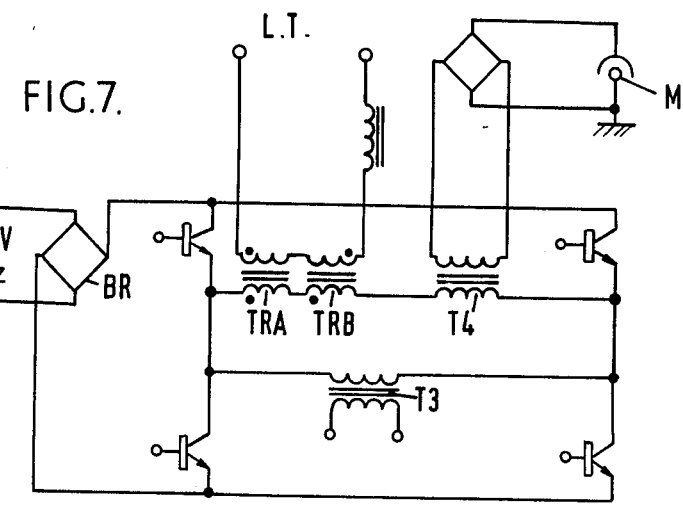

In the accompanying drawings:

FIG. 1 shows a power supply according to the present invention, but without its control circuit, connected to supply a fluorescent lamp, FIG. 2 shows a characteristic curve of the supply of FIG. 1, FIG. 3 shows waveforms associated with the supply of FIG. 1, FIG. 4 shows a control circuit which may be used for the circuit of FIG. 1, FIG. 5 shows an alternative control circuit, FIG. 6 shows one form of supply connected to a fluorescent lamp, FIG. 7 shows another form of supply connected to a magnetron, and FIG. 8 shows waveform associated with the supply of FIG. 7.

In carrying the invention into effect according to one convenient mode by way of example, FIG. 1 shows part of a power supply which includes an alternating voltage source 11 connected in series with the main windings connected in phase opposition, of two transductors (saturable reactors) 12 and 13, to supply a fluorescent lamp 14.

Means 16 are provided for passing a d.c. control current through the control windings of the two transductors 12 and 13, connected in series in phase assistance, and through a choke 15 connected in series to remove the A.C. and prevent variation of the D.C. current through the cycle.

The transductors 12 and 13 are operated in the forced magnetization mode, i.e. the d.c. control current is not allowed to vary during the operational cycle. Under these conditions, the transductors become a constant current source with a high output impedance and the output current is set by the d.c. current in the control winding.

FIG. 2 shows the output characteristic of each transductor. The transductor is biased to saturation at point A by the d.c. control current. At point A, $NcIc = NoIo$ where $Nc$ and $No$ are respectively the number of turns on the control and output windings, and $Ic$ and $Io$ are respectively the control and output currents.

When the alternating voltage from source 11 is applied to the main windings of the transductors 12 and 13, one transductor is driven in direction X (FIG. 2), i.e. further into saturation, and remains at a low impedance value, whilst the other transductor is driven in direction Y and when point B is reached this transductor enters its high impedance condition and any further increase in applied voltage only results in a very small increase in output current. FIG. 3 shows waveforms of transductor voltage and output current for an increase in voltage.

Since the core material of the transductors has a finite permeability up to the saturation 'knee', the effect of increasing the input supply to the circuit is to increase the peak output current. It is possible to compensate for this 'transfer admittance' in the d.c. control current circuit.

The greater the permeability of the core material of the transductors, the less is the effect of the transfer admittance.

Thus, better results are obtained using a material with a square loop hysteresis characteristic.

A control current circuit is shown schematically in FIG. 4. Reference diode D1 is supplied with current via R1 from a d.c. input supply proportional to the main supply to the system, R1 providing the base drive for VT1. Hence the emitter of VT1 is held at a fixed potential and thereby the transductor control current is set by RV1.

R2 supplies a current proportional to the supply voltage at the junction of RV1 and the emitter of VT1. The circuit holds the current through RV1 constant so that as the input voltage increases the transductor control current decreases and hence compensates for the transfer admittance of the transductor.

A further control circuit is shown schematically in FIG. 5. The advantage of this circuit is that the supply rail can be lower voltage and hence more efficient. Compensation for transfer admittance is obtained by selection of the ratio of R1/R2.

FIG. 6 shows a complete power supply connected to a fluorescent lamp 14 in which a transformer 18 is used to supply the alternating voltage to the transductors 12 and 13 and the lamp 14, and to supply the circuit of FIG. 4 via rectifier circuit 17.

The voltage source could be direct A.C. mains, or more likely, an inverter working from rectified mains or a low voltage d.c. source i.e. a battery. Frequency of operation could extend to beyond 30 K Hz.

FIGS. 7 and 8 show the system adapted for use in an electrical power supply for magnetrons used, for example, as the source of R.F. power, for example at a frequency of 2450 M Hz., in microwave heating devices.

There is thus an increasing need for a power supply which can operate from a conventional mains supply, i.e. 240V 50 Hz, or even d.c. from say a battery, to supply the requirements of a magnetron, for example an anode supply of 3500V at 0.5A d.c., and a filament supply of 5V at 20A a.c. usually with means for applying the filament voltage for a short period before the anode supply is applied. Moreover, the magnetron must be operated with a constant current anode supply.

When used for cooking purposes, cooking time is essentially determined by the mean power output of the magnetron and hence by the mean d.c. current fed to the magnetron. This current may be in the form of pulses, but there is a restriction on the peak - to - mean ratio which is typically 3 : 1.

Conventional power supplies for magnetrons use for the anode supply a mains - operated step-up transformer with a high leakage reactance between the primary and secondary windings, which together with an external capacitor provides the necessary current limiting. For the filament supply a separate mains - operated isolating transformer is used.

The magnetron output power is varied by varying the value of the capacitor, or a shunt resistance, in the anode supply circuit. Switching of the anode supply is usually achieved by a relay in the primary of the anode supply transformer.

These conventional circuits suffer from the disadvantages that they require large and heavy transformers and large capacitors, a high voltage switch for varying the output power, and a high current switch for applying the anode supply.

In the magnetron power supply to be described some or all of the above disadvantages are eliminated or effectively reduced.

FIG. 7 shows a complete magnetron power supply arranged to be energized by a 50 Hz mains supply and a d.c. control current.

By connecting the filament transformer $T_3$ across the transductor TR, the filament voltage is automatically reduced when the anode supply is applied, this often being a desired feature of the supply.

The mains input (waveform FIG. 8a is a rectified by a full wave bridge BR to produce d.c. (waveform FIG. 8b) which provides a supply for a high frequency inverter, which is arranged to produce an a.c. output (waveform FIG. 9c).

This a.c. output is fed to a transductor circuit similar to FIG. 1 but having two transductors TRA and TRB and filament and anode supply transformers T3 and T4.

Due to the voltage limiting characteristics of the magnetron M, the voltage from the output of transformer T4 has the form shown in FIG. 8d, and the voltage and current of the magnetron are as shown in FIGS. 8e and 8f.

The anode supply may be switched off by removing the d.c. control current thus operating the transductor in the high impedance region, and the ratio of shunt reactances for the transductors TRA and TRB and transformer T4 are so chosen that for peak input voltage the magnetron is not driven into conduction.

Output current to the magnetron is varied by merely varying the d.c. control current.

The circuit described above has the advantages that the power supply is much smaller and lighter than conventional power supplies due to operation at high frequencies. Although a frequency of 2 K Hz has been referred to by way of example, other frequencies such as, for example, 4, 10 or 20 K Hz, may be used with advantage. The current output may be varied, and the anode supply may be switched easily by the control of low level d.c. control current, the transductor forming a simple and versatile means of controlling the power output of the magnetron.

I claim:

1. An electrical power supply arranged to provide an alternating voltage output, said power supply comprising: an a.c. input source; a pair of transductors or saturable reactors having their output windings connected in phase opposition in series with the input source and the output; inverter means for supplying the input windings of the transductors with a constant d.c. control current independent of the output so as to operate in the forced magnetization mode thereby providing a constant current source with a high output impedance, the output current being set by the control current; and means for compensating "transfer admittance" in the d.c. control circuit, said compensating means comprising a transistor coupled in series with the transductors or reactors; a resistor in parallel with the series connected transistor and said transductors or reactors; means adapted to control the current through the resistor to be proportional to the input supply voltage, said transistor arranged so that the combined current through the resistor and the transductors or reactors is constant thereby causing the d.c. control current to be reduced when the input supply voltage increases.

2. An electrical power supply for providing energy to the anode and the filament of a magnetron, said power supply comprising: an a.c. input source; an output transformer connected to the anode of said magnetron; a pair of transductors or saturable reactors having their output windings connected in phase opposition in series with the input source and the output transformer; inverter means for supplying the input windings of the transductors or reactors with a constant d.c. control current independent of the output so as to operate in the forced magnetization mode thereby providing a constant current source with a high output impedance, the output current being set by the control current; and a transformer connected across said transductors or reactors to supply the filament energy for said magnetron.

3. An electrical power supply arranged to provide an alternating voltage output, said power supply comprising: an a.c. input source; a pair of transductors or saturable reactors having their output windings connected in phase opposition in series with said input source and said output, the control windings of said pair of transductors or saturable reactors being connected in series phase additive manner; invertor means for supplying said series connected control windings with a constant d.c. control current independent of the output so as to operate said pair of transductors or saturable reactors in the forced magnetization mode; and semiconductor means for compensating "transfer admittance" in the d.c. control circuit to cause the d.c. control current to be reduced when the voltage of said input source increases thereby providing a constant output current source having a high output current source having a high output impedance and having an output current magnitude set by the magnitude of the control current.

4. An electrical power supply as claimed in claim 3, wherein the frequency of operation of the inventer is up to 30 $KH_z$.

5. An electrical power supply as claimed in claim 3, wherein the output is connected to a fluorescent lamp.

6. An electrical power supply as claimed in claim 3, wherein the output is connected via an output transformer to the anode of a magnetron.

* * * * *